United States Patent
Roebuck

[15] 3,670,987
[45] June 20, 1972

[54] TROTLINE STORAGE REEL

[72] Inventor: James J. Roebuck, P.O. Box 213, Mont Belvieu, Tex. 77580

[22] Filed: Nov. 12, 1969

[21] Appl. No.: 876,007

[52] U.S. Cl. .................................. 242/118.4, 242/125.2
[51] Int. Cl. ................................ B65h 75/14, B65h 75/28
[58] Field of Search .............. 242/118.7, 118.8, 118.4, 118, 242/100, 106, 104, 84.1, 125.2

[56] References Cited

UNITED STATES PATENTS

| | | | |
|---|---|---|---|
| 2,531,816 | 11/1950 | Homoky | 242/100 |
| 2,936,963 | 5/1960 | Witte | 242/118 X |
| 3,008,664 | 11/1961 | McCormick | 242/118 X |
| 3,085,767 | 4/1963 | Zerbest | 242/106 |

*Primary Examiner*—George F. Mautz
*Attorney*—Pravel, Wilson & Matthews

[57] ABSTRACT

A trotline storage reel for storing a trotline in a coiled position comprising a central spool for receiving the main support line to which individual stagings, which are short lengths of line having a fish hook thereon, are connected to the main support line at longitudinally spaced intervals. The spool is provided with a radially extending flange adjacent one end thereof for supporting the individual stagings in an extended position and a plurality of openings are formed in the flange member for securing the fish hooks therein.

7 Claims, 3 Drawing Figures

PATENTED JUN 20 1972 3,670,987

James J. Roebuck
INVENTOR

BY

Pravel Wilson & Matthews
ATTORNEYS

TROTLINE STORAGE REEL

BACKGROUND OF THE INVENTION

1. Field of the Invention

The present invention relates to a trotline storage reel for storing a trotline in a coiled position so as to prevent the hooks carried on the stagings for becoming entangled with each other or with the main coiled support line to which they are connected.

2. Description of the Prior Art

Trotlines, which comprise a relatively long main support line having a plurality of stagings or short lines with hooks thereon connected to the main support line at longitudinally spaced points, have always presented a storage problem. In some instances, the stagings are adapted to be disconnected from the main support line so as to permit storage of the trotline and the stagings separately to prevent the various lines becoming entangled with each other. Various devices have been employed for storing trotlines with the stagings connected thereto. For example, some fishermen wind the main support line around one end of a hollow support housing and connect the individual hooks to the opposite end of the hollow support; others wrap the staging lines around the main support line and then coil the main support line in an effort to keep the stagings from becoming entangled with each other and still other fishermen coil the main support line with the stagings loose and attempt to store the stagings in the central portion of the main line coil and hope the stagings and the hooks thereon do not become entangled between periods of use.

SUMMARY OF THE INVENTION

The present invention provides a new and improved trotline storage reel comprising a central spool for coiling the main support line thereon and a radially extending annular shoulder adjacent one end of the spool for receiving the individual hook lines and supporting them in an extended position radially relative to the coiled main line with openings in the shoulder for supporting each of the hooks so as to prevent the staging lines and hooks thereon from becoming entangled with each other.

Another object of the present invention is to provide a new and improved trotline storage reel having a plurality of circumferentially spaced supports extending between a large diameter disc and a small diameter disc with a plurality of circumferentially spaced openings to provide air circulation through the storage reel for drying a wet trotline wound thereon with radial support means extending laterally outwardly from the spool to facilitate storage of the various trotline stagings in a position exposed to the air for drying.

DESCRIPTION OF THE PREFERRED EMBODIMENT

Figure 1:
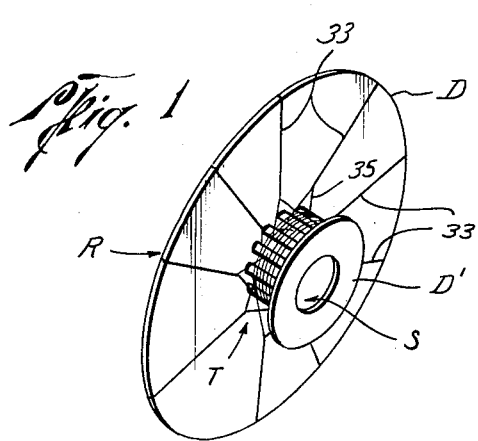
FIG. 1 is an isometric view of a trotline storage reel of the present invention showing a trotline coiled thereon.
Figure 2:
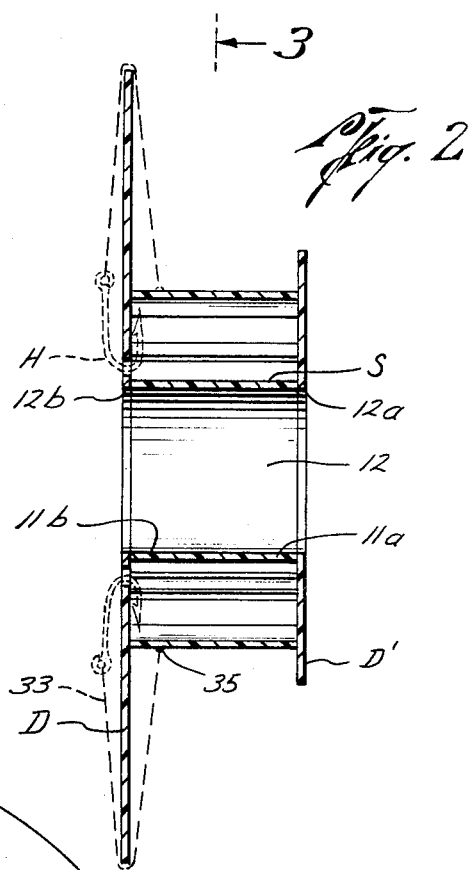
FIG. 2 is a transverse sectional view showing the details of construction of the trotline storage reel and showing the trotline staging lines and hooks thereon in phantom.
Figure 3:
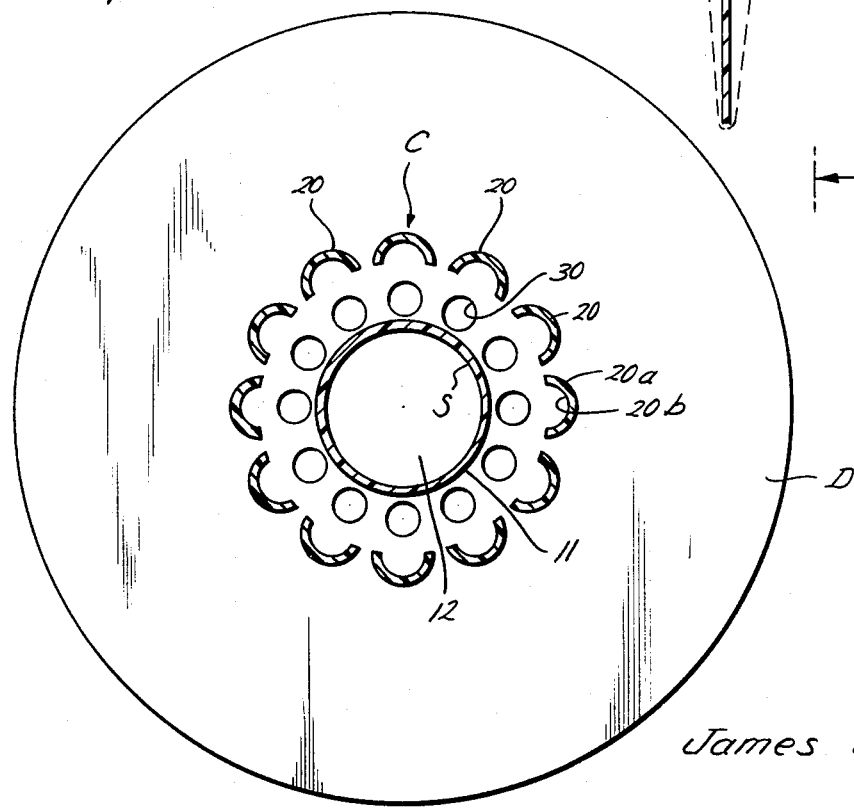
FIG. 3 is a sectional view taken on line 3—3 of FIG. 2 showing additional details of construction of the trotline storage reel of the present invention.

The trotline storage reel of the present invention is designated generally R in FIG. 1 of the drawings. Such reel includes a central spool S having a large diameter disc D affixed to one end and a small diameter disc D' affixed to the opposite end with a plurality of circumferentially spaced supports C positioned around such spool S. Means are provided in the large diameter disc D for receiving hooks H which are connected to the trotline T by means of individual staging lines as will be described in detail hereinafter.

Considering now the apparatus of the present invention in more detail, the spool S preferably comprises a hollow cylindrical or tubular member formed by the continuous sidewall 11 and having a central opening or passage 12 extending therethrough. The small diameter disc or base D' is secured on one end 11a of the cylindrical spool S and a large diameter disc D is secured to the opposite end 11b of such cylindrical spool S. Such discs D and D', respectively, may be secured to the spool S by glue or other suitable securing means, or may be formed integrally therewith, as desired. The discs D' and D are provided with central openings or apertures 12a and 12b, respectively, which are substantially the same diameter as the inside diameter of the opening 12 extending through the cylindrical spool S.

A plurality of circumferentially spaced trotline support members are positioned externally of the cylindrical spool S and adjacent thereto. Such members are disposed generally parallel to the sidewall 11 and extend longitudinally from the small diameter disc D' to a large diameter disc D. The opposite ends of such members 20 are secured to the discs D and D', respectively, by glue or other suitable securing means. In the preferred form of this invention the support members 20 comprise longitudinally extending half-cylinder pieces arranged with their convex curved sides 20a disposed radially outwardly away from the central cylinder S, and with their concave inner sides 20b facing the central cylinder S. The plurality of circumferentially spaced circular openings 30 are formed in the large diameter disc D for receiving the fish hooks H connected by individual staging lines 33 to the main support line 35. Such openings 30 are positioned adjacent the supports 20 and are disposed radially inwardly toward the cylindrical wall 11.

In using the trotline storage reel R of the present invention, one end of the main support line 35 is preferably wrapped or coiled about the central spool S to secure the trotline thereto. Thereafter, in coiling the support line 35 about the central spool S when a staging line 33 is reached, such staging line is extended radially outwardly so as to pass over the outer edge of the large diameter disc D and then the staging line is extended radially inwardly and the hook H attached to the outer end of such staging line is inserted in the nearest opening 30 which is aligned radially with such staging line 33. Thereafter, as the main line 35 is coiled around the spool S each time a staging line 33 is reached, such staging line is looped over the outer edge of the large diameter disc D with a hook H attached thereto inserted in the nearest adjacent opening 30. It will be appreciated that the main line 35 will be coiled around the trotline support members 20 which are positioned in circumferentially spaced positions around the central cylinder or spool S. Coiling of the main line 35 will continue until the entire line is coiled around the trotline support members 20 with each staging line 33 looped over the outer edge of the large diameter disc D and the hook attached to such line inserted in the nearest adjacent opening 30.

It will be appreciated that with a trotline stored on the storage reel of the present invention, the staging lines 33 will be retained in their radially extending positions with the hooks H attached to such staging lines inserted in the openings 30.

When it is desired to remove or uncoil the trotline T, the procedure for placing the main support line on the spool is reversed and the trotline is unwound therefrom. In unwinding the support line 35 each time a staging line 33 is reached, its hook H will be disconnected from the opening 30 in which it is held so that the trotline may be played out or unwound from the trotline storage reel R without the staging lines becoming entangled with each other or with the main support line 35. Also, it will be appreciated that if desired a short stick or other lateral support member may be inserted through the opening 12 in the cylinder S to thereby provide an axle for mounting the trotline storage reel R to facilitate rotation thereof in either coiling a trotline on such reel or removing it therefrom.

The foregoing disclosure and description of the invention are illustrative and explanatory thereof, and various changes in the size, shape, and materials as well as in the details of the illustrated construction may be made without departing from the spirit of the invention.

I claim:
1. A trotline storage reel for storing thereon a trotline having a mainline and a plurality of individual staging lines connected thereto at longitudinally spaced intervals along the trotline comprising:
   a. a support member for receiving said main line of said trotline coiled thereon;
   b. a laterally extending flange secured to one end of said storage member for receiving said plurality of staging lines connected to said main line and supporting such staging lines in radially extending position relative to the coiled main line to which they are connected; and
   c. hook receiving means with said flange for receiving hooks secured to the loose end of said staging lines when said staging lines are looped over the outer edge of said lateral extending flange to hold such staging line in a radially extended position.

2. The invention of claim 1 including a base member substantially parallel to said laterally extending flange and secured to the opposite end of said support member from said laterally extending flange.

3. The invention of claim 2 wherein said support member comprises a plurality of circumferentially spaced transverse members extending from said base member to said laterally extending flange.

4. The invention of claim 1 wherein said hook receiving means with said flange includes a plurality of openings in said laterally extending flange.

5. The invention of claim 4 wherein said plurality of openings is spaced circumferentially on said flange with said openings adjacent said support members.

6. The invention of claim 3 including a central cylindrical support connecting said base member and said lateral extending flange and disposed radially inwardly of said plurality of circumferentially spaced transverse members.

7. The invention of claim 3 wherein said circumferentially spaced transverse members have a C-shaped configuration with an inner concave surface and outer convex surface wherein said members are arranged with said outer convex surface disposed radially outwardly for receiving said main line of said trotline coiled on said storage reel.

* * * * *